United States Patent
Atarashi et al.

(10) Patent No.: US 8,957,157 B2
(45) Date of Patent: Feb. 17, 2015

(54) INJECTION MOLDED ARTICLE, AND METHOD FOR PRODUCING INJECTION MOLDED ARTICLE

(71) Applicant: Sumitomo Chemical Company, Limited, Chuo-ku, Tokyo (JP)

(72) Inventors: Kenji Atarashi, Ichihara (JP); Tetsuro Dobashi, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/019,770

(22) Filed: Sep. 6, 2013

(65) Prior Publication Data

US 2014/0066574 A1    Mar. 6, 2014

(30) Foreign Application Priority Data

Sep. 6, 2012   (JP) ................. 2012-195795

(51) Int. Cl.
  *C08L 23/10*   (2006.01)
  *C08L 23/06*   (2006.01)
  *C08L 23/12*   (2006.01)
  *B29C 45/00*   (2006.01)

(52) U.S. Cl.
  CPC ............ *C08L 23/12* (2013.01); *B29C 45/0001* (2013.01); *C08L 23/06* (2013.01); *C08L 23/10* (2013.01); *B29C 45/0005* (2013.01); *C08L 2205/16* (2013.01); *B29K 2423/0683* (2013.01)

USPC ........................................ 525/191; 525/240

(58) Field of Classification Search
  CPC ......... C08L 23/12; C08L 23/10; C08L 23/06; C08L 2205/16; B29C 45/0005; B29C 45/0001; B29K 2423/0683
  USPC .................................................. 525/191, 240
  See application file for complete search history.

(56) References Cited

U.S. PATENT DOCUMENTS 4,501,856 A * 2/1985 Harpell et al. ................. 525/240
6,521,709 B2 * 2/2003 Pitteri et al. ................... 525/240

* cited by examiner

*Primary Examiner* — Nathan M Nutter
(74) *Attorney, Agent, or Firm* — Panitch Schwarze Belisario & Nadel LLP

(57) ABSTRACT

Disclosed is an injection molded article made of a resin composition comprising 15 to 40% by mass of ultrahigh molecular weight polyethylene fibers, and 60 to 85% by mass of a thermoplastic resin having a melt flow rate of 70 to 500 g/10 min. measured at a temperature of 230° C. and a load of 21.2 N, and a fusion peak temperature lower than 160° C. measured with a differential scanning calorimeter, where the combined mass of the ultrahigh molecular weight polyethylene fibers and the thermoplastic resin is taken as 100% by mass, wherein the injection molded article satisfies the following requirements: the intrinsic volume resistivity is $1.0 \times 10^{15}$ $\Omega \cdot cm$ or more, the thermal conductivity is 1 W/m·K or more, and the specific gravity is 1.2 or less. The article is high in rigidity, impact resistance, electrically insulating property, and thermal conductivity.

2 Claims, No Drawings

INJECTION MOLDED ARTICLE, AND METHOD FOR PRODUCING INJECTION MOLDED ARTICLE

BACKGROUND OF THE INVENTION

1. Technical field

The present invention relates to an injection molded article that has high electrical insulating property, high heat conductivity, high rigidity, and high impact resistance and is light, and to a method for producing the same.

2. Related art

Electronic parts which are commonly collectively called "power modules" are high in both work voltage and the amount of heat generated and their casings are required to have high electrical insulating and high heat dissipation properties. Furthermore, such casings are needed to have rigidity and impact resistance high enough for internal component protection.

Power modules are used for hybrid or electric vehicles and there is a need for reduced vehicle weight for extending range of vehicles and casings of power modules are also required to be reduced in weight.

For example, WO 2009/116357 discloses a highly thermally conductive resin molded article made of a resin composition comprising a polyester resin and scaly hexagonal boron nitride contained therein, wherein the article has a thermal diffusivity of not less than 0.5 mm$^2$/sec measured in a plane direction of a plane having a thickness of 1.3 mm or less and has an intrinsic volume resistivity of not less than $10^{10}$ Ω·cm.

PROBLEMS TO BE SOLVED BY THE INVENTION

However, since the specific gravities of inorganic fillers used for composite resins disclosed in WO 2009/116357, etc. are higher than those of resins, e.g., 3.9 for alumina and 3.5 for boron nitride, any conventional highly thermally conductive resin molded article is high in specific gravity. Moreover, such conventional highly thermally conductive resin molded articles are insufficient in electrically insulating property, thermal conductivity, rigidity, and impact resistance, which are necessary for casings of electronic parts, and therefore more reduction in specific gravity and more improvement in electrically insulating property, thermal conductivity, rigidity, and impact resistance have been demanded.

SUMMARY OF THE INVENTION

In light of the aforementioned problems, it is an object of the present invention to provide a lightweight injection molded article having a high electrically insulating property, a high thermal conductivity, a high rigidity, and a high impact resistance, and a method for the production thereof.

The present invention provides an injection molded article made of a resin composition comprising 15 to 40% by mass of ultrahigh molecular weight polyethylene fibers, and 60 to 85% by mass of a thermoplastic resin having a melt flow rate of 70 to 500 g/10 min. measured at a temperature of 230° C. and a load of 21.2 N, and a fusion peak temperature lower than 160° C. measured with a differential scanning calorimeter, where the combined mass of the ultrahigh molecular weight polyethylene fibers and the thermoplastic resin is taken as 100% by mass, wherein the injection molded article satisfies the following requirement (1):

requirement (1): the intrinsic volume resistivity measured in accordance with the method provided in JIS K6911 is $1.0 \times 10^{15}$ Ω·cm or more, the thermal conductivity measured by the laser flash method is 1 W/m·K or more, and the specific gravity measured in accordance with ASTM D792 is 1.2 or less.

Moreover, the present invention provides a method for producing an injection molded article, the method comprising feeding a resin composition comprising 15 to 40% by mass of ultrahigh molecular weight polyethylene fibers and 60 to 85% by mass of a thermoplastic resin having a melt flow rate of 70 to 500 g/10 min. measured at a temperature of 230° C. and a load of 21.2 N, and a fusion peak temperature lower than 160° C. measured with a differential scanning calorimeter, to an injection molding machine having a cylinder unit, the maximum temperature of the cylinder unit being controlled to a temperature that is equal to or higher than a temperature 3° C. higher than the fusion peak temperature of the thermoplastic resin and that is equal to or lower than a temperature 20° C. higher than the fusion peak temperature of the thermoplastic resin, melt-kneading the fed resin composition in the cylinder unit, wherein the residence time in the cylinder unit of the resin composition is adjusted to from 12 seconds to 300 seconds, and injection molding the melt-kneaded resin composition to form an injection molded article.

According to the present invention, a lightweight injection molded article having a high rigidity, a high impact resistance, a high electrically insulating property, and a high thermal conductivity can be obtained.

DETAILED DESCRIPTION OF THE PREFERRED EMBODIMENTS

The injection molded article of the present invention comprises ultrahigh molecular weight polyethylene fibers and a thermoplastic resin. A detailed description is made below.

<Ultrahigh Molecular Weight Polyethylene Fibers>

The ultrahigh molecular weight polyethylene to form ultrahigh molecular weight polyethylene fibers in the present invention is polyethylene that usually has a weight average molecular weight (Mw) of from 500,000 to 10,000,000, and in view of the rigidity and the impact resistance of an injection molded article to be obtained, preferably of 1,000,000 or more, more preferably of 1,500,000 or more. The weight average molecular weight in the context of the present invention is a polystyrene-equivalent weight average molecular weight measured by gel permeation chromatography, and a specific method for its measurement is described in the section of "EXAMPLES." The ultrahigh molecular weight polyethylene fibers are preferably those containing fewer defects inside fibers, being uniform filaments forming the fibers, and being high in thermal conductivity. The thermal conductivity of the ultrahigh molecular weight polyethylene fibers is usually from 1 W/m·K to 100 W/m·K. In view of the heat conducting property of an injection molded article to be obtained, the thermal conductivity is preferably 5 W/m·K (or more, more preferably 10 W/m·K or more. The ultrahigh molecular weight polyethylene fibers are described in Jpn. J. Appl. Phys. Vol. 36(1997) pp. 5633-5637, "Thermal Conductivity and Diffusivity of High-Strength Polymer Fibers," for example.

<Thermoplastic Resin>

The thermoplastic resin contained in the injection molded article of the present invention is a thermoplastic resin that has a melt flow rate of 70 to 500 g/10 min. measured at a temperature of 230° C. and a load of 21.2 N, and a fusion peak temperature lower than 160° C. measured with a differential scanning calorimeter.

Specific examples of the thermoplastic resin include polyolefin, polystyrene, and poly(methyl methacrylate). The thermoplastic resin may be used either singly or in a combination of two or more members thereof.

The thermoplastic resin is preferably a polyolefin in view of suppression of degradation of the ultrahigh molecular weight polyethylene fibers in the molding process. Examples of polyolefins to be used preferably in the present invention include polypropylene, polyethylene, and an α-olefin resin containing as a primary constituent an α-olefin having 4 or more carbon atoms. The polyolefin may be used either singly or in a combination of two or more members thereof. A low density polyethylene is more preferred.

It is noted that the above-mentioned term "thermoplastic resin" does not encompass polyethylene having a weight average molecular weight (Mw) of 500,000 or more, namely, the above-described "ultrahigh molecular weight polyethylene."

Examples of the polypropylene include propylene homopolymers, propylene-ethylene random copolymers, and propylene-ethylene copolymers prepared by homopolymerizing propylene and then copolymerizing ethylene with propylene in the presence of the propylene homopolymer generated in advance.

Examples of the polyethylene include ethylene homopolymers, and ethylene-α-olefin random copolymers, which are copolymers of ethylene with an α-olefin having 4 or more carbon atoms.

Examples of the α-olefin resin containing an α-olefin having 4 or more carbon atoms include α-olefin-propylene random copolymers.

Examples of the α-olefin having 4 or more carbon atoms to be used for the polyolefin include 1-butene, 2-methyl-1-propene, 2-methyl-1-butene, 3-methyl-1-butene, 1-hexene, 2-ethyl-1-butene, 2,3-dimethyl-1-butene, 1-pentene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, and 1-dodecene. 1-Butene, 1-pentene, 1-hexene, and 1-octene are preferred.

Examples of the method for polymerizing an olefin include bulk polymerization, solution polymerization, slurry polymerization, and vapor phase polymerization. The bulk polymerization is a method in which polymerization is carried out using, as a medium, an olefin that is liquid at the polymerization temperature, and the solution polymerization and the slurry polymerization are both a method in which polymerization is carried out in an inert hydrocarbon solvent, such as propane, butane, isobutane, pentane, hexane, heptane, and octane. The vapor phase polymerization is a method in which a gaseous monomer is used as a medium and a gaseous monomer is polymerized in the medium.

These polymerization methods can be conducted either in a batch system or in a continuous system, and they can be conducted either in a single stage system in which polymerization is conducted within a single polymerization reactor or in a multi-stage system in which polymerization is conducted in a polymerization apparatus composed of two or more polymerization reactors connected in series. Such polymerization methods can be combined optionally. From the industrial and economical point of view, a continuous vapor phase polymerization method or a bulk-vapor phase polymerization method in which a bulk polymerization method and a vapor phase polymerization method are used continuously is preferred.

Conditions in the polymerization step (e.g., polymerization temperature, polymerization pressure, monomer concentration, input amount of catalyst, and polymerization time) can be determined optionally.

Examples of the catalyst to be used for the production of the polyolefin include multisite catalysts and single site catalysts. Examples of preferred multisite catalysts include catalysts which are obtained by the use of a solid catalyst component comprising a titanium atom, a magnesium atom and a halogen atom, and examples of preferred single site catalysts include metallocene catalysts.

The melt flow rate (MFR) of the thermoplastic resin measured at a temperature of 230° C. and a load of 21.2 N is 70 g/10 min. to 500 g/10 min., preferably 200 g/10 min to 500 g/10 min. If the MFR is less than 70 g/10 min., fibers may fracture in a cylinder unit. If the MFR exceeds 500 g/10 min., sufficient rigidity or sufficient impact strength may not be obtained. The measurement of the MFR in the present invention is carried out in accordance with the method provided in JIS K7210.

The fusion peak temperature of the thermoplastic resin measured with a differential scanning calorimeter is a temperature at which the magnitude of heat flow indicated by a peak height in a fusion curve measured with the differential scanning calorimeter exhibits the maximum value. The fusion curve is a differential scanning calorimetry curve produced in the procedure described below. Sequential thermal histories (1) to (4) given below are applied to about 5 mg of a sample sealed within an aluminum pan with a differential scanning calorimeter (for example, TA Instruments Q100); (1) holding at 230° C. for 5 minutes, (2) cooling from 230° C. to 40° C. at a rate 5° C./min., (3) holding at 40° C. for 5 minutes, (4) heating from 40° C. to 230° C. at a rate 5° C./min. In the step (4) is measured a differential scanning calorimetry curve.

The fusion peak temperature of the thermoplastic resin measured with a differential scanning calorimeter is lower than 160° C., preferably not lower than 90° C. but lower than 160° C., more preferably from 95° C. to 150° C., and even more preferably from 100° C. to 140° C. Injection molded articles of the present invention comprising a thermoplastic resin whose fusion peak temperature is not lower than 90° C. are suitable in terms of heat resistance for casings of power electronic parts which generate a large amount of heat. Moreover, injection molded articles of the present invention comprising a thermoplastic resin whose fusion peak temperature is lower than 160° C. are superior in electrically insulating property, thermal conductivity, rigidity, and impact resistance because ultrahigh molecular weight polyethylene fibers are less prone to be degraded during an injection molding process.

<Filler, Additives>

In order to improve the processing characteristics, mechanical characteristics, electrical characteristics, thermal characteristics, surface characteristics, and stability to light, various types of additives may be incorporated into the resin composition to be used for the present invention. Examples of such additives include fillers, antioxidants, neutralizers, plasticizers, lubricants, release agents, antibonding agents, heat stabilizers, light stabilizers, flame retardants, pigments, and dyes.

<Injection Molded Article>

The injection molded article of the present invention is an injection molded article made of a resin composition comprising 15 to 40% by mass of ultrahigh molecular weight polyethylene fibers, and 60 to 85% by mass of a thermoplastic resin having a melt flow rate of 70 to 500 g/10 min. measured at a temperature of 230° C. and a load of 21.2 N, and a fusion peak temperature lower than 160° C. measured with a differential scanning calorimeter, where the combined mass of the ultrahigh molecular weight polyethylene fibers and the thermoplastic resin is taken as 100% by mass, and more particularly, it is such an injection molded article which satisfies the following requirement (1):

requirement (1): the intrinsic volume resistivity measured in accordance with the method provided in JIS K6911 is $1.0 \times 10^{15}$ Ω·cm or more, the thermal conductivity measured by the laser flash method is 1 W/m·K or more, and the specific gravity measured in accordance with ASTM D792 is 1.2 or less.

In view of thermal conductivity, the content of the ultrahigh molecular weight polyethylene fibers contained in the injection molded article of the present invention is preferably 20% by mass or more and the content of the thermoplastic resin is preferably 80% by mass or less. In view of injection moldability, the content of the ultrahigh molecular weight polyethylene fibers is preferably 35% by mass or less and the content of the thermoplastic resin is preferably 65% by mass or more.

The thermal conductivity of the injection molded article of the present invention measured by the laser flash method is 1 W/m·K or more. The thermal conductivity is a value obtained by measuring by the laser flash method the thermal conductivity in the thickness direction of a specimen being 10 mm in diameter and 1 mm in thickness cut from an arbitrary position of an injection molded article.

The fiber length of the ultrahigh molecular weight polyethylene fibers in the injection molded article of the present invention is preferably 1 mm or more, more preferably 2 mm or more. The fiber length of the ultrahigh molecular weight polyethylene fibers in the injection molded article is preferably 50 mm or less. The fiber length can be measured by the following method.

A specimen with a size of 5 mm×10 mm×1 mm is cut from an arbitrary position of an injection molded article. The specimen is held at 115° C. for 3 minutes with a press molding machine (a compression molding machine F-37 manufactured by Shinto Metal Industries Corporation) and then pressurized at 10 MPa for 1 minute. Subsequently, the specimen is cooled at 30° C. for 2 minutes to afford a thin piece having a thickness 100 μm. Fibers in the thin piece are captured as a binary image with an image analyzer and a weighted mean of the length of 50 fibers is calculated. The weighted mean is defined as fiber length. When two or more fibers overlap in the specimen, the observer individualizes the fibers while monitoring the image because it is difficult to produce a binary image automatically.

<Method for Producing an Injection Molded Article>

The injection molded article of the present invention can be produced by feeding a resin composition comprising 15 to 40% by mass of ultrahigh molecular weight polyethylene fibers and 60 to 85% by mass of a thermoplastic resin having a melt flow rate of 70 to 500 g/10 min. measured at a temperature of 230° C. and a load of 21.2 N, and a fusion peak temperature lower than 160° C. measured with a differential scanning calorimeter, where the total mass of the ultrahigh molecular weight polyethylene fibers and the thermoplastic resin is taken as 100% by mass, to an injection molding machine having a cylinder unit the maximum temperature of which is controlled to a temperature that is equal to or higher than a temperature 3° C. higher than the fusion peak temperature of the thermoplastic resin and that is equal to or lower than a temperature 20° C. higher than the fusion peak temperature of the thermoplastic resin, melt-kneading the fed resin composition in the cylinder unit so that the residence time in the cylinder unit will be from 12 seconds to 300 seconds, and injection molding the melt-kneaded resin composition.

In view of the Izod impact strength of an injection molded article to be obtained, it is preferred to control the residence time of the resin composition in the cylinder unit to within the range of from 12 seconds to 200 seconds.

The resin composition to be fed to the cylinder unit of the injection molding machine can be prepared by mixing a thermoplastic resin, ultrahigh molecular weight polyethylene fibers, and a filler, an additive, etc. which are optionally used, uniformly with a mixing device such as a Henschel mixer and a tumbler, and then melt-kneading them with a plasticizing device.

In order to control the degradation of the ultrahigh molecular weight polyethylene fibers during the melt-kneading, it is preferred to set the temperature of the plasticizing device to a temperature that is equal to or higher than a temperature 3° C. higher than the fusion peak temperature of the thermoplastic resin and that is equal to or lower than a temperature 20° C. higher than the fusion peak temperature of the thermoplastic resin. As for the melt-kneading, it is preferred to control kneading conditions appropriately in order to suppress the fracture of the ultrahigh molecular weight polyethylene fibers. The plasticizing device as used herein is a device that heats a thermoplastic resin to a temperature equal to or higher than the melting point thereof and then kneads the molten thermoplastic resin. Examples of the plasticizing device include a Banbury mixer, a single screw extruder, a co-rotating twin screw extruder (e.g., TEM [registered trademark] manufactured by Toshiba Machine Co., Ltd. and TEX [registered trademark] manufactured by Japan Steel Works, Ltd.), and a counter-rotating twin screw extruder (FCM [registered trademark] manufactured by Kobe Steel, Ltd. and CMP [registered trademark] by Japan Steel Works, Ltd.).

The resin composition to be fed to a cylinder unit of an injection molding machine may be a resin composition prepared by a pultrusion method. The pultrusion method is basically a method of impregnating a continuous fiber bundle with a resin while pulling the fiber bundle; one example thereof is a method that comprises passing a fiber bundle through a crosshead and at the same time feeding a molten resin component to the crosshead from an extruder or the like, thereby impregnating the fiber bundle with the resin component. More preferred is the pultrusion method using the crosshead disclosed in, for example, JP-A-3-272830.

A resin composition prepared by melt-kneading with a plasticizing device then pelletized and a resin composition prepared by a pultrusion method and then pelletized are sometimes called a resin composition pellet.

In one possible embodiment, resin composition pellets prepared by the pultrusion method and resin composition pellets prepared by the melt-kneading method are blended and then injection molded.

Preferably, the resin composition pellets prepared by the pultrusion method are 2 to 50 mm in length. The fiber length is more preferably 3 to 20 mm, and even more preferably 5 to 15 mm. Adjusting the length of the resin composition pellets prepared by the pultrusion method to 2 mm or longer can afford an injection molded article that is particularly high in rigidity, impact strength, and thermal conductivity. Adjusting the length of the resin composition pellets prepared by the pultrusion method to 50 mm or shorter makes it possible to fill a molten resin composition into a mold cavity easily in an injection molding process.

In another possible embodiment, a thermoplastic resin, ultrahigh molecular weight polyethylene fibers, and a filler, an additive, etc. to be optionally used are mixed uniformly with a mixing device such as a Henschel mixer and a tumbler, and the resulting mixture is fed directly into a cylinder unit of an injection molding machine. In view of easiness in uniformly dispersing ultrahigh molecular weight polyethylene fibers in an injection molded article, it is preferred to feed into a cylinder unit of an injection molding machine a resin composition prepared by a pultrusion method or by a method involving melt-kneading with the above-described plasticizing device.

Injection molded articles of the present invention can be used suitably for power module packages and battery cases.

EXAMPLES

The present invention is described below with reference to Examples.

In the following Examples and Comparative Examples, materials described below were used.

<Fiber>
Ultrahigh Molecular Weight Polyethylene Fiber:
  Ultrahigh molecular weight polyethylene fiber, Dyneema Roving 2640 produced by Toyobo Co., Ltd., which had a fineness of 2640 dtex, a single yarn diameter of 12 μm, a thermal conductivity of 50 W/m·K, a weight average molecular weight (Mw) of 2,800,000.
Polyethylene Naphthalate Fiber:
  Trademark TEONEX produced by Teijin Fibers, Ltd., which had a fineness of 1670 dtex and a single yarn diameter of 33 μm.
Glass Fiber:
  T425 produced by Nippon Electric Glass Co., Ltd., which had a fineness of 2320 tex and a single yarn diameter of 23 μm.
Carbon Fiber:
  Registered trademark DIALEAD K223HE produced by Mitsubishi Plastics, Inc., which had a number average fiber length of 6 mm, a diameter of 11 μm, and a thermal conductivity of 550 W/m·K.
<Thermoplastic Resin>
  Thermoplastic resin A-1: a resin prepared by mixing a polypropylene (NOBLEN W101 produced by Sumitomo Chemical Co., Ltd.; a polypropylene having a fusion peak temperature of 130° C. and an MFR of 5 g/10 min. measured at a temperature of 230° C. and a load of 21.2 N) with 0.5 parts by mass, per 100 parts by mass of the polypropylene, of the peroxide described below, feeding them into an extruder, and melt-kneading them under the conditions described below to peroxidically degrade the polypropylene and thereby adjust the MFR to 240 g/10 min. The fusion peak temperature of the peroxidically degraded polypropylene was 132° C.
Conditions for Peroxidical Degradation
  Peroxide: PERHEXA 25B-40 produced by NOF Corporation
  Extruder: 40 mmφ single screw extruder Model VS40-28 manufactured by Tanabe Plastics Machinery Co., Ltd.
  Extruder operation conditions: a temperature of 250° C., an extruder rotation rate of 60 rpm
Thermoplastic resin A-2: low density polyethylene (G808 produced by Sumitomo Chemical Co., Ltd.; a fusion peak temperature of 102° C.; an MFR of 470 g/10 min. measured at a temperature of 230° C. and a load of 21.2 N; a weight average molecular weight (Mw) of 60,000)
Thermoplastic resin A-3: polypropylene (NOBLEN U501E1 produced by Sumitomo Chemical Co., Ltd.; a fusion peak temperature of 161° C.; an MFR of 70 g/10 min. measured at a temperature of 230° C. and a load of 21.2 N)
Thermoplastic resin A-4: high density polyethylene (M6910 produced by Keiyo Polyethylene Co., Ltd.; a fusion peak temperature of 132° C.; an MFR of 30 g/10 min. measured at a temperature of 230° C. and a load of 21.2 N)

Conditions for injection molding are as follows.
Molding machine: "SI-30III" manufactured by Toyo Machinery & Metals Co., Ltd.
Injecting conditions:
Injection speed: 20 mm/sec.
Injection pressure: 108 MPa
Holding pressure: 29 MPa
Back pressure: 5 MPa
Mold temperature: 50° C.
Cooling time: 25 seconds

[Evaluation of Physical Properties]
Evaluation items of the injection molded articles produced in examples and comparative examples and the measurement methods thereof are as follows. The evaluation results are shown in Tables 1 and 2.

(1) Melt Flow Rate (MFR; Unit: g/10 min.)
The melt flow rate of a thermoplastic resin was measured in accordance with the method provided in JIS K7210. The measurement was conducted at a temperature of 230° C. and a load of 2.16 kg.

(2) Weight Average Molecular Weight (Mw)
The polystyrene-equivalent weight molecular chain length (Aw) of a sample was measured using the gel permeation chromatograph (GPC) method under conditions (1) to (8) described below. A straight line was defined as the baseline on the chromatogram, the straight line having been obtained by connecting a point within a stable horizontal region with retention times sufficiently shorter than the appearance of a sample elution peak and a point within a stable horizontal region with retention times sufficiently longer than the observance of a solvent elution peak. The weight average molecular weight (Mw) of the sample was calculated using the polystyrene-equivalent weight average molecular chain length (Aw) measured and the Q factor of polyethylene (17.7).

Weight average molecular weight (Mw)=molecular chain length (Aw)×Q factor (1) Instrument: Waters 150C manufactured by Waters
(2) Separation column: TOSOH TSKgel GMH6-HT, 2 columns
(3) Measurement temperature: 152° C.
(4) Carrier: orthodichlorobenzene
(5) Flow rate: 1.0 mL/min.
(6) Injection amount: 500 μL.
(7) Detector: differential refractometer
(8) Molecular weight standard substance: standard polystyrenes (3) Specific Gravity
The specific gravity of a sample was measured in accordance with ASTM D792.

(4) Fusion Peak Temperature (unit: ° C.)
A fusion curve of a sample was measured according to the temperature program given below with a differential scanning calorimeter (TA Instruments Q100) and then the fusion peak temperature of the sample was determined from the fusion peak obtained in step (4).

Temperature Program
(1): holding at 230° C. for 5 minutes.
(2): cooling from 230° C. to 40° C. at a rate 5° C./min.
(3): holding at 40° C. for 5 minutes.
(4): heating from 40° C. to 200° C. at a rate 5° C./min.
Sample weight: 5 mg (5) Thermal Conductivity (Unit: W/m·K)

The thermal conductivity of a molded article was measured using a laser flash method.

A specimen with a diameter 10 mm and a thickness 1 mm was cut out from an injection molded article. Using this specimen, the thermal conductivity in the thickness direction of the specimen was measured with a laser flash thermal constants analyzer (TC-7000 manufactured by ULVAC Technologies, Inc.).

(6) Intrinsic Volume Resistivity (Unit: Ω·cm)

The intrinsic volume resistivity of an injection molded article was measured in accordance with JIS K 6911 with a digital insulation tester DSM-8103 manufactured by DKK-TOA Corporation.

(7) Flexural Modulus (FM, unit: MPa)

Using a specimen (4 mm in thickness) prepared by injection molding, evaluation was conducted at a span length of 100 mm, a width of 10 mm, a loading speed of 2.0 mm/min., a temperature of 23° C. in accordance with the method provided in JIS K7171.

(8) Izod Impact Strength (Izod, Unit: kJ/cm$^2$)

Using a specimen (4 mm in thickness) prepared by injection molding, a notched Izod impact strength was evaluated in accordance with the method provided in JIS K7110. The measurement was conducted at a temperature of 23° C.

Example 1

Ultrahigh molecular weight polyethylene fiber Dyneema Roving 2640 and thermoplastic resin A-1 were processed in a weight ratio of 30/70 into a resin composition via a pultrusion process at an impregnation temperature of 140° C. The time for which the ultrahigh molecular weight polyethylene fiber was exposed to the impregnation temperature was not longer than 20 seconds. This resin composition was injection molded with the cylinder unit being controlled to a temperature equal to or lower than 135° C. The residence time in the cylinder was 18 seconds. The evaluation results of the resulting molded article are shown in Table 1.

Example 2

Ultrahigh molecular weight polyethylene fiber Dyneema Roving 2640 and thermoplastic resin A-2 were processed in a weight ratio of 30/70 into a resin composition via a pultrusion process at an impregnation temperature of 120° C. The time for which the ultrahigh molecular weight polyethylene fiber was exposed to the impregnation temperature was not longer than 20 seconds. This resin composition was injection molded with the cylinder unit being controlled to a temperature equal to or lower than 115° C. The residence time in the cylinder was 12 seconds. The evaluation results of the resulting molded article are shown in Table 1.

Example 3

The operations were conducted in the same manner as in Example 2 except that the weight ratio of the fiber to the thermoplastic resin of Example 2 was changed to 20/80. The evaluation results of the resulting molded article are shown in Table 1.

Example 4

The operations were conducted in the same manner as in Example 2 except that the residence time in the cylinder was changed to 180 seconds. The evaluation results of the resulting molded article are shown in Table 1.

Comparative Example 1

Thermoplastic resin A-1 containing no ultrahigh molecular weight polyethylene fibers was injection molded with the cylinder unit being controlled to a temperature equal to or lower than 135° C. and with the residence time in the cylinder being adjusted to 18 seconds. The evaluation results of the resulting molded article are shown in Table 1.

Comparative Example 2

Thermoplastic resin A-2 containing no ultrahigh molecular weight polyethylene fibers was injection molded with the cylinder unit being controlled to a temperature equal to or lower than 115° C. and with the residence time in the cylinder being adjusted to 12 seconds. The evaluation results of the resulting molded article are shown in Table 1.

Comparative Example 3

An attempt was made to obtain a resin composition in the same manner as in Example 1 except that thermoplastic resin A-1 in Example 1 was replaced with thermoplastic resin A-3 and the impregnation temperature was adjusted to 165° C. The ultrahigh molecular weight polyethylene fibers fractured during the impregnation step in the pultrusion process, so that no resin composition could be obtained.

Comparative Example 4

An attempt was made to obtain a resin composition in the same manner as in Example 1 except that thermoplastic resin A-1 in Example 1 was replaced with thermoplastic resin A-4. The ultrahigh molecular weight polyethylene fibers fractured during the impregnation step in the pultrusion process, so that no resin composition could be obtained.

Comparative Example 5

The operations were conducted in the same manner as in Example 1 except that the weight ratio of the ultrahigh molecular weight polyethylene fiber to the thermoplastic resin A-1 was changed to 6/94. The evaluation results of the resulting molded article are shown in Table 2.

Comparative Example 6

The operations were conducted in the same manner as in Example 1 except that the weight ratio of the ultrahigh molecular weight polyethylene fiber to the thermoplastic resin A-1 was changed to 13/87. The evaluation results of the resulting molded article are shown in Table 2.

Comparative Example 7

A resin composition was obtained by processing polyethylene naphthalate fibers, trademark TEONEX, produced by Teijin Fibers, Ltd. and thermoplastic resin A-3 in a weight ratio of 30/70 via a pultrusion process at an impregnation temperature of 180° C. This resin composition was injection molded with the cylinder unit being controlled to a temperature equal to or lower than 180° C. The evaluation results of the resulting molded article are shown in Table 2.

Comparative Example 8

The operations were conducted in the same manner as in Comparative Example 7 except for replacing the polyethylene naphthalate fibers, trademark TEONEX, produced by Teijin Fibers, Ltd. with glass fibers T425, produced by Nippon Electric Glass Co., Ltd. The evaluation results of the resulting molded article are shown in Table 2.

Comparative Example 9

The operations were conducted in the same manner as in Comparative Example 7 except for replacing the polyethylene naphthalate fibers, trademark TEONEX, produced by Teijin Fibers, Ltd. with carbon fibers, registered trademark DIALEAD K223HE, produced by Mitsubishi Plastics, Inc. The evaluation results of the resulting molded article are shown in Table 2.

TABLE 1

| | Example | | | | Comparative Example | | |
|---|---|---|---|---|---|---|---|
| | 1 | 2 | 3 | 4 | 1 | 2 | 3 |
| Specific gravity | 0.9 | 0.9 | 0.9 | 0.9 | 0.9 | 0.9 | 0.9 |
| Thermal conductivity (W/m · K) | 1.2 | 1.9 | 1.5 | 1.9 | 0.3 | 0.4 | — |
| Intrinsic volume resistivity (Ω · cm) | $2.6 \times 10^{15}$ | $4.4 \times 10^{16}$ | $1.9 \times 10^{16}$ | $4.4 \times 10^{16}$ | $1.3 \times 10^{16}$ | $1.9 \times 10^{16}$ | — |
| Izod impact strength (kJ/cm²) | 23 | 45 | 41 | 52 | 4 | 34 | — |
| Flexural modulus (MPa) | 950 | 470 | 510 | 540 | 740 | 110 | — |
| Residual fiber length (mm) | 2.7 | 3.2 | 2.9 | 3.2 | — | — | — |

TABLE 2

| | Comparative Example | | | | | |
|---|---|---|---|---|---|---|
| | 4 | 5 | 6 | 7 | 8 | 9 |
| Specific gravity | 0.9 | 0.9 | 0.9 | 1.0 | 1.1 | 1.2 |
| Thermal conductivity (W/m · K) | — | — | — | 0.4 | 0.3 | 11 |
| Intrinsic volume resistivity (Ω · cm) | — | — | — | $8.2 \times 10^{14}$ | $8.9 \times 10^{14}$ | $1.0 \times 10^{8}$ or more |
| Izod impact strength (kJ/cm²) | — | 34 | 40 | 51 | 16 | 3 |
| Flexural modulus (MPa) | — | 210 | 370 | 2000 | 6200 | 6100 |
| Residual fiber length (mm) | — | 4.1 | 4.1 | 4.0 | 3.0 | 0.4 |

As described above, lightweight injection molded articles being sufficiently high in rigidity, impact resistance, electrically insulating property, and thermal conductivity were able to be obtained in Examples 1 to 4. In Comparative Examples 1 and 2, in which no ultrahigh molecular weight polyethylene fibers were included, the heat conductivity was low, and in Comparative Example 7, in which polyethylene naphthalate fibers were used instead of ultrahigh molecular weight polyethylene fibers, and in Comparative Example 8, in which glass fibers were used instead of ultrahigh molecular weight polyethylene fibers, the heat conductivity was low. Comparative Example 9, in which carbon fibers were used, was inferior in insulating property and impact strength. In Comparative Examples 3 and 4, no injection molded article could be obtained. In Comparative Examples 5 and 6, sufficiently high rigidity could not be obtained.

What is claimed is:

1. An injection molded article made of a resin composition comprising 15 to 40% by mass of ultrahigh molecular weight polyethylene fibers, and 60 to 85% by mass of a thermoplastic resin having a melt flow rate of 70 to 500 g/10 min. measured at a temperature of 230° C. and a load of 21.2 N, and a fusion peak temperature lower than 160° C. measured with a differential scanning calorimeter, where the combined mass of the ultrahigh molecular weight polyethylene fibers and the thermoplastic resin is taken as 100% by mass, wherein the injection molded article satisfies the following requirement (1):

requirement (1): the intrinsic volume resistivity measured in accordance with the method provided in JIS K6911 is $1.0 \times 10^{15}$ Ω·cm or more, the thermal conductivity measured by the laser flash method is 1 W/m·K or more, and the specific gravity measured in accordance with ASTM D792 is 1.2 or less.

2. A method for producing an injection molded article, the method comprising:

feeding a resin composition comprising 15 to 40% by mass of ultrahigh molecular weight polyethylene fibers and 60 to 85% by mass of a thermoplastic resin having a melt flow rate of 70 to 500 g/10 min. measured at a temperature of 230° C. and a load of 21.2 N, and a fusion peak temperature lower than 160° C. measured with a differential scanning calorimeter, to an injection molding machine having a cylinder unit, the maximum temperature of the cylinder unit being controlled to a temperature that is equal to or higher than a temperature 3° C. higher than the fusion peak temperature of the thermoplastic resin and that is equal to or lower than a temperature 20° C. higher than the fusion peak temperature of the thermoplastic resin, melt-kneading the fed resin composition in the cylinder unit, wherein the residence time in the cylinder unit of the resin composition is adjusted to from 12 seconds to 300 seconds, and injection molding the melt-kneaded resin composition to form an injection molded article.

* * * * *